United States Patent [19]
Sammons et al.

[11] Patent Number: 6,068,020
[45] Date of Patent: May 30, 2000

[54] GAS LINE SAFETY DEVICE

[76] Inventors: James E. Sammons, 3754 Karlin Ave., Norfolk, Va. 23502; John P. Gancel, 413 Shorebird La., Chesapeake, Va. 23323

[21] Appl. No.: 09/359,817

[22] Filed: Jul. 23, 1999

[51] Int. Cl.[7] .................................................. F16K 35/00
[52] U.S. Cl. ........................ 137/383; 137/381; 137/377; 138/76 R
[58] Field of Search ................................ 137/383, 381, 137/377; 138/96 R

[56] References Cited

U.S. PATENT DOCUMENTS

| | | | |
|---|---|---|---|
| 1,743,350 | 1/1930 | Hopkins | 137/383 |
| 2,300,060 | 10/1942 | Phillips | 138/96 R |
| 3,160,175 | 12/1964 | Laemmle | 138/96 R |
| 3,350,044 | 10/1967 | Zulauf | 138/96 R |
| 4,269,221 | 5/1981 | Adams | 137/383 |
| 4,370,919 | 2/1983 | Wagner et al. | 138/96 R X |
| 5,092,359 | 3/1992 | Wirth et al. | 137/382 |

*Primary Examiner*—John Rivell
*Assistant Examiner*—Thomas L. McShane

[57] ABSTRACT

A lockable dual gas feed line securing device comprising: a yoke having first and second gas line engagement cylinders joined by a first rigid separator, and a gas outlet engagement member comprising a pair of fittings that engage fittings on the open ends of gas feed lines and are joined by a second rigid separator. Each of the first and second gas line engagement cylinders comprises a cylinder of a size to receive the gas feed line and a gas outlet engagement member. The first and second rigid separators include apertures that, when the safety device is installed on a pair of gas lines, lie in registration for receipt of a suitable locking mechanism that inhibits separation of the yoke and the gas outlet engagement member without disengagement of the locking mechanism.

3 Claims, 2 Drawing Sheets

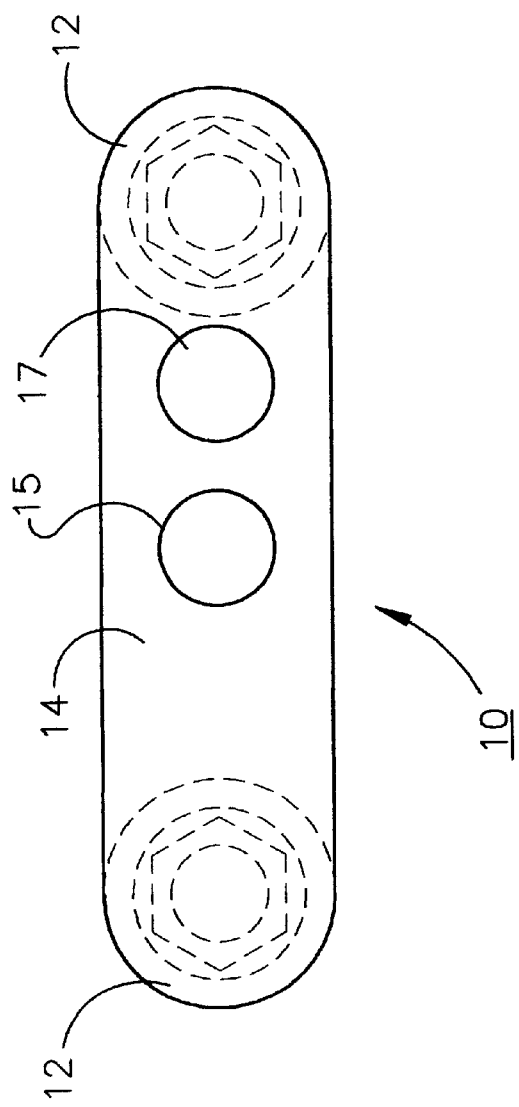
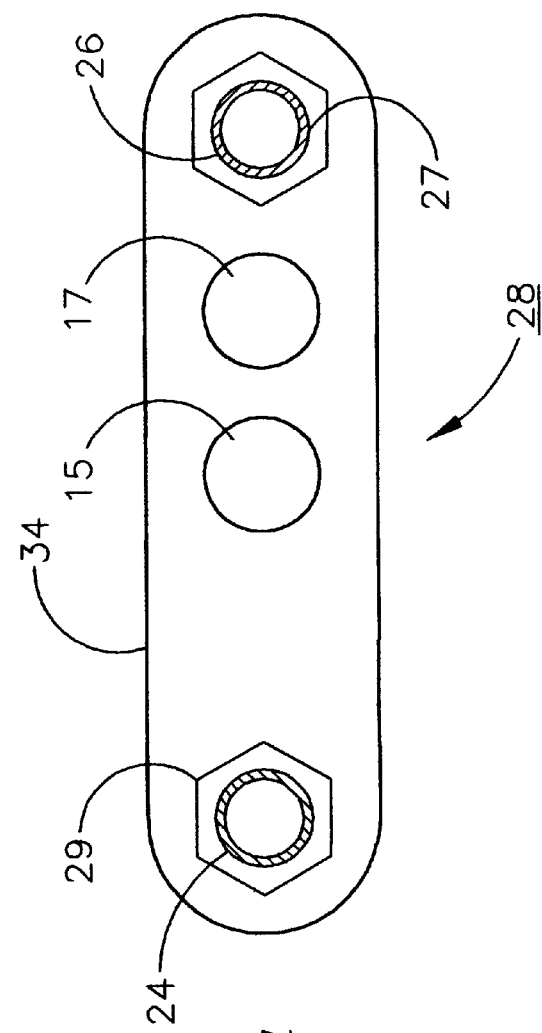

GAS LINE SAFETY DEVICE

FIELD OF THE INVENTION

The present invention relates to lockable safety devices for gas feed lines particularly to paired such feed lines that supply mixed gases such as oxygen and a fuel gas.

BACKGROUND OF THE INVENTION

Common sense, personnel safety and more recently Federal Regulations dictate that potential harmful equipment, devices and machinery that can cause personal injury, if not properly secured during maintenance or down times be equipped with appropriate lockable devices for securing such equipment during such periods. Substantial effort has been devoted to so-called "lockout" devices for electrical equipment that are applied during maintenance. Less effort, however, seems to have been directed toward properly securing equally potentially dangerous gas lines particularly those that supply two or more gases such as oxygen and a fuel gas as are used in welding, cutting, etc. operations.

The potential for leakage of such gases, especially in enclosed spaces where failure to properly secure gas feed lines in such a manner that gas leakage results, can produce a potentially explosive gas mixture in a very short period of time.

OBJECT OF THE INVENTION

It is the object of the present invention to provide a gas supply "lockout" device that when property applied to a gas feed line, especially dual oxygen and fuel such feed lines, provides protection against any accidental leakage of gas therefrom.

SUMMARY OF THE INVENTION

According to the present invention, there is provided a lockable dual gas feed line safety device comprising: a yoke having first and second gas line engagement cylinders joined by a first rigid separator, and a gas outlet engagement member comprising a pair of fittings that engage fittings on the open ends of gas feed lines and are joined by a second rigid separator. Each of the first and second gas line engagement cylinders comprises concentric cylinders of a size to receive the gas feed line fittings. The first and second rigid separators include apertures that, when installed on a pair of gas lines, lie in registration for receipt of a suitable locking mechanism that inhibits separation of the yoke and the gas outlet engagement member without disengagement of the locking mechanism.

DESCRIPTION OF THE DRAWINGS

FIG. 3 is a top view of the yoke portion of the safety device of the present invention.

FIG. 4 is a bottom view of the gas outlet engagement member of the safety device of the present invention.

DETAILED DESCRIPTION OF THE INVENTION

Figure 1:
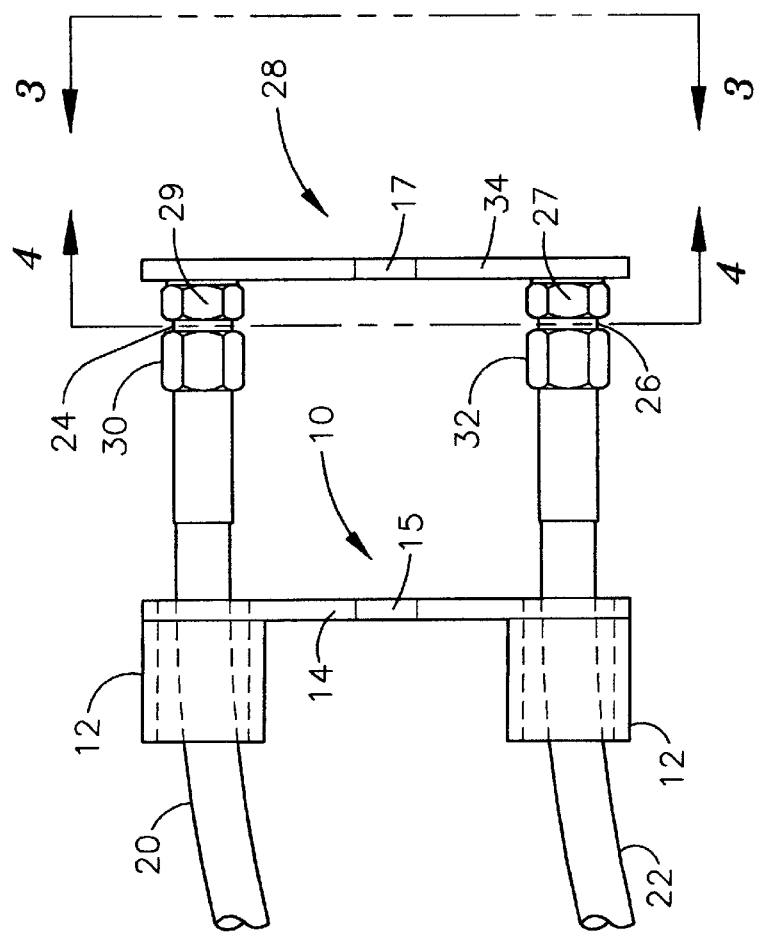
FIG. 1 is a side view of the safety device of the present invention in its partially installed condition on a pair of gas feed lines.

As shown most clearly in FIGS. 1 and 3, the safety device of the present invention comprises a yoke 10 that is made up of a pair of gas line engagement cylinders 12 joined by a rigid separator 14. Gas line engagement cylinders 12 are of a size to receive gas feed line fittings 30 and 32. As shown in FIG. 1, yoke 10 is preferably left engaged about feed lines 20 and 22 even when not secured with a lock.

Separator 14 includes an aperture 15 or apertures 15 and 17 for registration with matching apertures 15 or 15 and 17 in separator 34, described below, and installation of a suitable locking device.

The second portion of the safety device of the present invention, gas outlet engagement member 28 comprises a pair of fittings 24 and 26 adapted to engage the mating fittings 30 and 32 at the ends of gas feed lines 20 and 22 and joined by a second rigid separator 34. Fittings 30 and 32 are preferably threaded and rotatably attached to gas feed lines 20 and 22 and designed for attachment of various tools such as cutting torches, welding torches, etc.. Fittings 24 and 26 preferably comprise threaded fittings that engage fittings 30 and 32 just as a fitting on such a tool would engage them. As depicted in FIGS. 1 and 4, fittings 30 and 32 are female fittings and fittings 24 and 26 are male fittings, but the utility and effectiveness of the safety device of the present invention, is independent of the particular fitting design or arrangement utilized. So long as the particular fitting on gas feed fines 20 and 22 and those on gas line engagement member 28 form a reliable junction that cannot be readily separated without some sort of manipulation that is prevented with the application of yoke 10 and a locking mechanism 36 as described herein, a device incorporating them should be considered within the intended scope of the present invention. In the particular, non-limiting arrangement depicted in the Figures, threaded portions 24 and 26 are machined and fitted or threaded into rigid separator 34 and having nuts 29 and 27 threaded thereon to retain them in place against gas line fittings 30 and 32.

Figure 2:
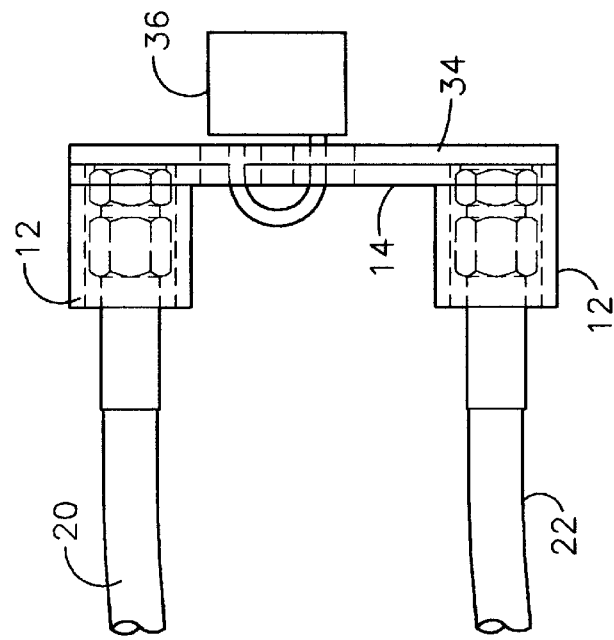
FIG. 2 is a side view of the safety device of the present invention in its fully installed and secured condition.

Separator 34 includes a suitable aperture 17 that lies in registration with aperture 15 when the safety device is assembled, i.e. installed, on gas feed lines 20 and 22 as shown in FIG. 2. A locking mechanism such as that depicted at 36 in FIG. 2 is inserted through aperture 15 and its matching aperture 17 in separator 34 and locked to prevent removal of the safety device without unlocking of locking mechanism 36. It should be noted that although locking mechanism 36 is depicted as a padlock in FIG. 2, any number of alternative locking devices may be applied through the apertures to prevent removal of the safety device of the present invention and a large number of such mechanisms are well know to those skilled in the art.

The safety device of the resent invention may be fabricated of any suitable material including plastic or metal. The use of plastic, for example by injection molding, provides a relatively low cost manufacturing process and part, while the use of metal, either cast or wrought provides a somewhat higher manufacturing cost and part, but a more durable device.

In use, the safety device of the present invention is applied by inserting gas feed lines 20 and 22 through cylinders 12 in yoke 10. Fittings 30 and 32 are then screwed onto fittings 24 and 26 to a snug leak-proof tightness. Yoke 10 is then slid upward toward gas outlet engagement member 28 such that cylinders 12 receive fittings 30 and 32. In this configuration apertures 15 and 17 in separators 14 and 34 lie in registration and padlock 36 or some other suitable locking mechanism is installed through the apertures and locked. The ends of gas feed lines 20 and 22 are thereby sealed against leakage and the safety device cannot be removed without an appropriate key.

As the invention has been described, it will be apparent to those skilled in the art that the same may be varied in any ways without departing from the spirit and scope thereof. Any and all such modifications are intended to be included within the scope of the appended claims.

What is claimed is:

1. A gas feed line safety device for securing the terminal ends of a pair of gas feed lines having fittings thereon comprising:
   a) a yoke comprising a pair of gas feed line engagement cylinders joined by a first separator, said separator having a locking aperture therein; and
   b) a gas outlet engagement member comprising a pair of fittings for engagement with said fittings on said gas feed lines, mounted to and joined by a second separator, said second separator having at least one locking aperture therein;
   each of said gas line engagement cylinders being of a size to receive said gas feed line and said gas outlet engagement member fittings; and said apertures in said first and second separators lying in registration for insertion of a locking mechanism therethrough when said safety device is assembled by insertion of said gas feed line fittings into said second concentric cylinders.

2. The gas feed line safety device of claim 1 wherein said gas feed line fittings comprise threaded female fittings and said gas outlet engagement member fittings comprise threaded male fittings.

3. The gas feed line safety device of claim 2 further including a locking mechanism inserted into said registering apertures.

* * * * *